(12) United States Patent
Inoue et al.

(10) Patent No.: US 8,815,449 B2
(45) Date of Patent: Aug. 26, 2014

(54) POSITIVE ELECTRODE AND NON-AQUEOUS ELECTROLYTE SECONDARY BATTERY

(75) Inventors: Takao Inoue, Aichi (JP); Masahisa Fujimoto, Osaka (JP); Kumiko Kanai, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 122 days.

(21) Appl. No.: 11/883,815

(22) PCT Filed: Jan. 20, 2006

(86) PCT No.: PCT/JP2006/300880
§ 371 (c)(1),
(2), (4) Date: May 19, 2008

(87) PCT Pub. No.: WO2006/082719
PCT Pub. Date: Aug. 10, 2006

(65) Prior Publication Data
US 2009/0053613 A1 Feb. 26, 2009

(30) Foreign Application Priority Data

Feb. 7, 2005 (JP) .................................. 2005-030890
Feb. 7, 2005 (JP) .................................. 2005-030892

(51) Int. Cl.
*H01M 4/505* (2010.01)
*H01M 4/64* (2006.01)
*H01M 10/056* (2010.01)

(52) U.S. Cl.
USPC ........ 429/231.9; 429/233; 429/224; 429/339; 429/341; 429/199; 429/206; 429/338

(58) Field of Classification Search
USPC ............. 429/129, 303, 304, 306, 218, 232, 429/218.1, 188, 224, 329, 231.1, 231.9, 429/233, 339, 341, 199; 423/599
See application file for complete search history.

(56) References Cited

U.S. PATENT DOCUMENTS 4,668,596 A * 5/1987 Shacklette et al. ............ 429/329
5,503,930 A * 4/1996 Maruyama et al. ........... 428/402
(Continued)

FOREIGN PATENT DOCUMENTS

EP 1339116 A2 * 8/2003 ............. H01M 4/02
JP 11-171910 6/1999
(Continued)

OTHER PUBLICATIONS

Machine translation of JP 2003-086179, Mar. 2003, Arai, et al.*
Machine translation of JP 2002-280078, Sep. 2002, Akashi.*
Machine translation of JP 2004-296270, Oct. 2004, Yoshida et al.*
Machine translation of JP 2003-109594, Apr. 2003, Takeuchi et al.*
Todres, "Organic Ion Radicals Chemistry and Applications", p. 293, 2002.*
Thackeray. "Manganese Oxides for Lithium Batteries", Prog. Solid State Chem. 25 (1997), p. 1-2, 59-60, 70-71.*
(Continued)

*Primary Examiner* — Kenneth Douyette
(74) *Attorney, Agent, or Firm* — Kratz, Quintos & Hanson, LLP (57) ABSTRACT

A material (hereinafter referred to as "positive electrode material") including sodium manganate powder as a positive electrode active material, carbon black powder as a conductive agent, and polytetrafluoroethylene as a binder is prepared. The positive electrode material is mixed in an N-methylpyrrolidone solution to produce slurry as a positive electrode mixture. A working electrode is produced by applying the slurry on a positive electrode collector. A negative electrode containing tin or germanium is produced. The non-aqueous electrolyte is produced by adding sodium hexafluorophosphate as an electrolyte salt in a non-aqueous solvent produced by mixing ethylenecarbonate and diethyl carbonate.

9 Claims, 6 Drawing Sheets

(56) References Cited

U.S. PATENT DOCUMENTS

| | | | |
|---|---|---|---|
| 5,558,961 A * | 9/1996 | Doeff et al. | 429/224 |
| 5,571,637 A * | 11/1996 | Idota | 429/338 |
| 6,193,947 B1 * | 2/2001 | Tabuchi et al. | 423/599 |
| 6,551,746 B1 * | 4/2003 | Vitins et al. | 429/231.1 |
| 2004/0002002 A1 * | 1/2004 | Mizuta et al. | 429/188 |
| 2004/0023111 A1 | 2/2004 | Ohshita et al. | 429/218.1 |
| 2004/0166409 A1 * | 8/2004 | Takada et al. | 429/218.1 |

FOREIGN PATENT DOCUMENTS

| | | |
|---|---|---|
| JP | 11-171912 | 6/1999 |
| JP | 2001-332256 | 11/2001 |
| JP | 2001-332258 | 11/2001 |
| JP | 2002-279995 | 9/2002 |
| JP | 2002-280078 | 9/2002 |
| JP | 2002-280080 | 9/2002 |
| JP | 2002-313337 | 10/2002 |
| JP | 2003-86179 | 3/2003 |
| JP | 2003-109594 | 4/2003 |
| JP | 2003-151549 | 5/2003 |
| JP | 2004-111329 | 4/2004 |
| JP | 2004-296270 | 10/2004 |
| KR | 2003-80067 | 10/2003 |
| WO | WO 02/097907 A2 | 12/2002 |

OTHER PUBLICATIONS

Burkhanov et al., "Sodium Carbonate as a Solid Electrolyte and Catalyst", Inorganic Materials, vol. 41, No. 9, 2005, pp. 995-997 Apr. 7, 2005.*

J.-P. Parant, et al.; "Sur Quelques Nouvelles Phases de Formule $Na_xMnO_2$ ($x \leq 1$);" *Journal of Solid State Chemistry*; vol. 3; 1971; pp. 1-11./Yes-Abstract.

Thackeray, Manganese Oxides for Lithium Batteries, *Prog. Solid St. Chem.* vol. 25, pp. 1-71, 1997.

Korean Office Action dated Jan. 29, 2010, with English Translation.

Chinese Office Action dated Oct. 16, 2009, with English Translation.

Machine translation of JP 11-171910 published Jun. 29, 1999.

Machine translation of JP 11-171912 published Jun. 29, 1999.

Machine translation of JP 2002-280080 published Sep. 27, 2002.

Machine translation of JP 2002-279995 published Sep. 27, 2002.

Machine translation of JP 2001-332258 published Nov. 30, 2001.

Machine translation of JP 2001-332256 published Nov. 30, 2001.

Japanese Office Action for Japanese Application No. 2005-030890 mailed Dec. 28, 2010, with English translation.

Japanese Office Action for Japanese Application No. 2005-030892 mailed Dec. 28, 2010, with English translation.

\* cited by examiner

POSITIVE ELECTRODE AND NON-AQUEOUS ELECTROLYTE SECONDARY BATTERY

TECHNICAL FIELD

The present invention relates to a positive electrode and a non-aqueous electrolyte secondary battery including the positive electrode, a negative electrode, and a non-aqueous electrolyte.

BACKGROUND ART

Today, non-aqueous electrolyte secondary batteries are in wide use as secondary batteries with high energy density, in which lithium ions for example are transferred between a positive electrode and a negative electrode to carry out charge and discharge.

In such a non-aqueous electrolyte secondary battery in general, a composite oxide of a lithium transition metal having a layered structure of lithium nickel oxide ($LiNiO_2$), lithium cobalt oxide ($LiCoO_2$) or the like is used as the positive electrode, and a carbon material capable of storing and releasing lithium, a lithium metal, a lithium alloy, or the like is used as the negative electrode (see, for example, Patent Document 1).

Using the above-mentioned non-aqueous electrolyte secondary battery, a discharge capacity from 150 mAh/g to 180 mAh/g, a potential of about 4 V and a theoretical capacity of about 260 mAh/g can be obtained.

The non-aqueous electrolyte produced by dissolving an electrolyte salt such as lithium tetrafluoroborate ($LiBF_4$) or lithium hexafluorophosphate ($LiPF_6$) in an organic solvent such as ethylene carbonate or diethyl carbonate is used.
[Patent Document 1] JP 2003-151549 A

DISCLOSURE OF THE INVENTION

Problems to be Solved by the Invention

In such a conventional non-aqueous electrolyte secondary battery using lithium ions, however, an oxide of cobalt (Co) or nickel (Ni) is mainly used as the positive electrode, and these materials are limited as resources.

When all the lithium ions are released from the lithium nickel oxide or lithium cobalt oxide in the non-aqueous electrolyte secondary battery, the crystal structure of the lithium nickel oxide or lithium cobalt oxide is destroyed. Consequently, oxygen is released from the lithium nickel oxide or lithium cobalt oxide, which gives rise to safety concerns. Therefore, the discharge capacity cannot be increased from the described level.

In some cases, manganese (Mn) as a naturally abundant resource is used instead of nickel or cobalt, but the capacity of the resulting non-aqueous electrolyte secondary battery is halved.

The use of manganese makes it difficult to produce lithium manganese oxide ($LiMnO_2$) having a layered structure employed to improve the mobility of lithium ions. Therefore, lithium manganese oxide ($LiMn_2O_4$) having a spinel structure is generally used. In the case of $LiMn_2O_4$, the state of $MnO_2$ is maintained after all the lithium ions are released. Since manganese is stable in a quadrivalent state, oxygen is not released and the safety is well secured.

Using $LiMn_2O_4$, however, while a potential of 4 V can be obtained, only a discharge capacity from 100 mAh/g to 120 mAh/g can be obtained.

There have been attempts to produce $LiMnO_2$ with a layered structure, but the potential is reduced to about 3V and repetition of discharge/charge cycles changes the $LiMnO_2$ into $LiMn_2O_4$ in a spinel structure. It is believed that $LiMnO_2$ in a layered structure is not chemically stable because the radius of the lithium ions is small.

Meanwhile, studies concerning non-aqueous electrolyte secondary batteries using sodium ions instead of lithium ions have recently been started.

In such a non-aqueous electrolyte secondary battery using sodium ions, if a negative electrode containing highly practical carbon capable of storing and releasing lithium ions is used similarly to the non-aqueous electrolyte secondary battery using lithium ions, sodium ions are not sufficiently stored in and released from the negative electrode and high specific charge/discharge capacity cannot be obtained.

In the non-aqueous electrolyte secondary battery using sodium ions, if a negative electrode containing silicon is used, the sodium ions are not sufficiently stored in and released from the negative electrode.

Therefore, studies concerning the use of a metal containing sodium for a negative electrode in a non-aqueous electrolyte secondary battery using sodium ions have been underway. There are abundant supplies of sodium from seawater, and therefore the use of sodium can reduce the cost.

However, the charge and discharge reaction of the non-aqueous electrolyte secondary battery is carried out by dissolution and precipitation of sodium ions and therefore neither high charge/discharge efficiency nor a high charge/discharge characteristic are obtained.

Repetition of charge and discharge process causes a branch-like precipitate (dendrite) to be more easily generated in the non-aqueous electrolyte. The dendrite may cause internal short-circuiting, and sufficient safety cannot be secured.

It is an object of the invention to provide a positive electrode of an inexpensive material that can sufficiently store and release ions.

Another object of the invention is to provide an inexpensive non-aqueous electrolyte secondary battery that allows reversible charge and discharge to be carried out and a good cycle characteristic to be obtained.

Means for Solving the Problems

A positive electrode according to one aspect of the invention includes an oxide containing sodium and manganese.

In the positive electrode according to the invention, the positive electrode includes an oxide containing sodium and manganese, so that sodium ions are sufficiently stored in and released from the positive electrode. Furthermore, the use of sodium that is available in abundance as a resource can reduce the cost.

The oxide may include $Na_xNnO_{2+y}$, where x may be more than 0 and at most 1, and y may be more than −0.1 and less than 0.1. In this way, sodium ions are surely stored in and released from the positive electrode.

The crystal system of the oxide may be a hexagonal system, an orthorhombic system, a monoclinic system, or a tetragonal system. In this way, sodium ions are efficiently stored in and released from the positive electrode.

A non-aqueous electrolyte secondary battery according to another aspect of the invention includes a positive electrode, a negative electrode, and a non-aqueous electrolyte containing sodium ions, and the positive electrode includes an oxide containing sodium and manganese.

In the non-aqueous electrolyte secondary battery according to the invention, the use of the positive electrode including an oxide containing sodium and manganese allows sodium ions to be sufficiently stored in and released from the positive electrode.

Using the positive electrode described above, a non-aqueous electrolyte secondary battery that allows reversible charge and discharge to be carried out and a good cycle characteristic to be obtained can be provided. Furthermore, the use of sodium that is available in abundance as a resource can reduce the cost of the non-aqueous electrolyte secondary battery.

The negative electrode may include elemental tin or elemental germanium. In this way, sodium ions are sufficiently stored in and released from the negative electrode.

The negative electrode may include a collector of a metal, and the elemental tin and the elemental germanium may be formed into a thin film state on the collector. In this way, the elemental tin and elemental germanium are easily formed as a thin film on the collector.

The collector may have a roughened surface. In this way, when elemental tin or elemental germanium is deposited on the collector of the negative electrode having the roughened surface, the surface of the layer of the deposited elemental tin or elemental germanium (hereinafter referred to as "negative electrode active material layer") has a shape conforming to the irregular shape on the electrode collector caused by the roughening.

When charge and discharge is carried out using the negative electrode active material layer, stress associated with expansion and contraction of the negative electrode active material layer concentrates at the irregular part of the negative electrode active material layer, so that cracks are formed in the irregular part of the negative electrode active material layer. The cracks allow the stress generated by the charge and discharge to be dispersed. In this way, reversible charge and discharge is more easily carried out, so that a good charge/discharge characteristic can be obtained.

The arithmetic mean roughness of the surface of the collector may be not less than 0.1 µm nor more than 10 µm. In this way, reversible charge and discharge is more easily carried out, so that a better charge/discharge characteristic can be obtained.

The non-aqueous electrolyte may include sodium hexafluorophosphate. In this way, improved safety can be secured.

The non-aqueous electrolyte may include one or more selected from the group consisting of a cyclic carbonate, a chain carbonate, esters, cyclic ethers, chain ethers, nitriles, and amides. In this way, the cost can be reduced and improved safety can be secured.

Effects of the Invention

The positive electrode according to the invention allows sodium ions to be sufficiently stored in and released from the positive electrode. The use of sodium that is available in abundance as a resource can reduce the cost.

In the non-aqueous electrolyte secondary battery according to invention, the use of the positive electrode allows reversible charge and discharge to be carried out, and the use of sodium that is available in abundance as a resource can reduce the cost.

BEST MODE FOR CARRYING OUT THE INVENTION

A non-aqueous electrolyte secondary battery according to the following embodiment includes a working electrode (hereinafter referred to as "positive electrode"), a counter electrode (hereinafter referred to as "negative electrode"), and a non-aqueous electrolyte.

Note that the materials and the thickness, the concentrations and the like of the materials are not limited to those in the following description and may be set as required.

(1) First Embodiment

Manufacture of Positive Electrode

A material (hereinafter referred to as "positive electrode material") containing for example 85 parts by weight of sodium manganate ($Na_xMnO_{2+y}$)(for example $0<x\leq1$, $-0.1<y<0.1$) powder as a positive electrode active material, 10 parts by weight of Ketjenblack, carbon black powder serving as a conductive agent, and 5 parts by weight of polyvinylidene fluoride as a binder is prepared. Note that the sodium manganate contained in the positive electrode active material is for example $Na_{0.7}MnO_{2+y}$ where x in the above formula is substituted by 0.7.

According to the embodiment, as an example of the sodium manganate, sodium manganate having a hexagonal crystal system (crystalline structure) and defined by JCPDS (Joint Committee on Powder Diffraction Standards) as card No. 270751 is used. The JCPDS has a database of X-ray diffraction data of about 6000 kinds of inorganic and organic compounds.

Note that examples of sodium manganate that can be used in place of card No. 270751 sodium manganate described above may include card Nos. 250844, 720415, and 720831 sodium manganate of an orthorhombic system (S. G. Pmmn), card Nos. 270747 and 270752 sodium manganate of an orthorhombic system (S. G. C), card No. 380965 sodium manganate of an orthorhombic system, card Nos. 250845 and 270749 sodium manganate of a monoclinic system (b-axis), card No. 720830 sodium manganate of a monoclinic system (b-axis) (S. G. C2/m) and card No. 270747 sodium manganate of a tetragonal system (S. G. I).

The positive electrode material is for example mixed to a 10% N-methylpyrrolidone solution by weight to the positive electrode material, and slurry as a positive electrode mixture is produced.

Then, the slurry is for example applied by a doctor blade method on a 3-by-3 cm region of an aluminum foil as thick as 18 µm for example as a positive electrode collector, then dried and formed into a positive electrode active material layer.

Then, a positive electrode tab is attached on a region of the aluminum foil where the positive electrode active material layer is not formed to form a positive electrode.

Note that instead of the polyvinylidene fluoride, the binder in the positive electrode material may be at least one selected from polytetrafluoroethylene, polyethylene oxide, polyvinyl acetate, polymethacrylate, polyacrylate, polyacrylonitrile, polyvinyl alcohol, styrene-butadiene rubber, carboxymethylcellulose, and the like.

If the amount of the binder is excessive, the ratio of the positive electrode active material contained in the positive electrode material is reduced, and therefore a high energy density cannot be obtained. Therefore, the amount of the binder is from 0% to 30% by weight relative to the entire positive electrode material, preferably from 0% to 20% by weight, more preferably from 0% to 10% by weight.

Instead of the Ketjenblack as the conductive agent contained in the positive electrode material, other carbon materials such as acetylene black and graphite may be used. Note that if the content of the conductive agent is too small, the conductivity of the positive electrode material cannot be sufficiently improved, while if the amount of the agent is excessive, the ratio of the positive electrode active material contained in the positive electrode material is reduced, and a high energy density cannot be obtained. Therefore, the amount of the conductive agent is from 0% to 30% by weight relative to the entire positive electrode material, preferably from 0% to 20% by weight, more preferably from 0% to 10% by weight.

As the positive electrode collector, foamed aluminum, foamed nickel or the like may be used to improve the electronic conductivity.

<Manufacture of Non-Aqueous Electrolyte>

A non-aqueous electrolyte produced by dissolving an electrolyte salt in a non-aqueous solvent may be used.

Examples of the non-aqueous solvent may include a cyclic carbonate, a chain carbonate, esters, cyclic ethers, chain ethers, nitriles, amides, and a combination thereof, which are typically used as a non-aqueous solvent for a battery.

Examples of the cyclic carbonate may include ethylene carbonate, propylene carbonate, butylene carbonate, and any of the above having its hydrogen group partly or entirely fluorinated such as trifluoropropylene carbonate and fluoroethyl carbonate.

Examples of the chain carbonate may include dimethyl carbonate, ethyl methyl carbonate, diethyl carbonate, methyl propyl carbonate, ethyl propyl carbonate, methyl isopropyl carbonate, and any of the above having its hydrogen group partly or entirely fluorinated.

Examples of the esters may include methyl acetate, ethyl acetate, propyl acetate, methyl propionate, ethyl propionate, and γ-butyrolactone. Examples of the cyclic ethers may include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and a crown ether.

Examples of the chain ethers may include 1,2-dimethoxyethane, diethyl ether, dipropyl ether, diisopropyl ether, dibutyl ether, dihexyl ether, ethyl vinyl ether, butyl vinyl ether, methylphenyl ether, ethylphenyl ether, butylphenyl ether, pentylphenyl ether, methoxytoluene, benzylethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, trienthylene glycol dimethyl ether, and tetraethylene glycol dimethyl.

An example of the nitriles may include acetonitrile, and an example of the amides may include dimethylformamide.

Examples of the electrolyte salt may include substances excluding peroxides with high safety that are soluble to a non-aqueous solvent such as sodium hexafluorophosphate ($NaPF_6$), sodium tetrafluoroborate ($NaBF_4$), $NaCF_3SO_3$, and NaBeTi. Note that one of the above electrolyte salts may be used or two or more of the above may be combined for use.

According to the embodiment, the non-aqueous electrolyte is produced by adding sodium hexafluorophosphate as an electrolyte salt in a concentration of 1 mol/l to a non-aqueous solvent produced by mixing ethylene carbonate and diethyl carbonate in the ratio of 50:50 by volume.

<Manufacture of Non-Aqueous Electrolyte Secondary Battery>

Figure 1:
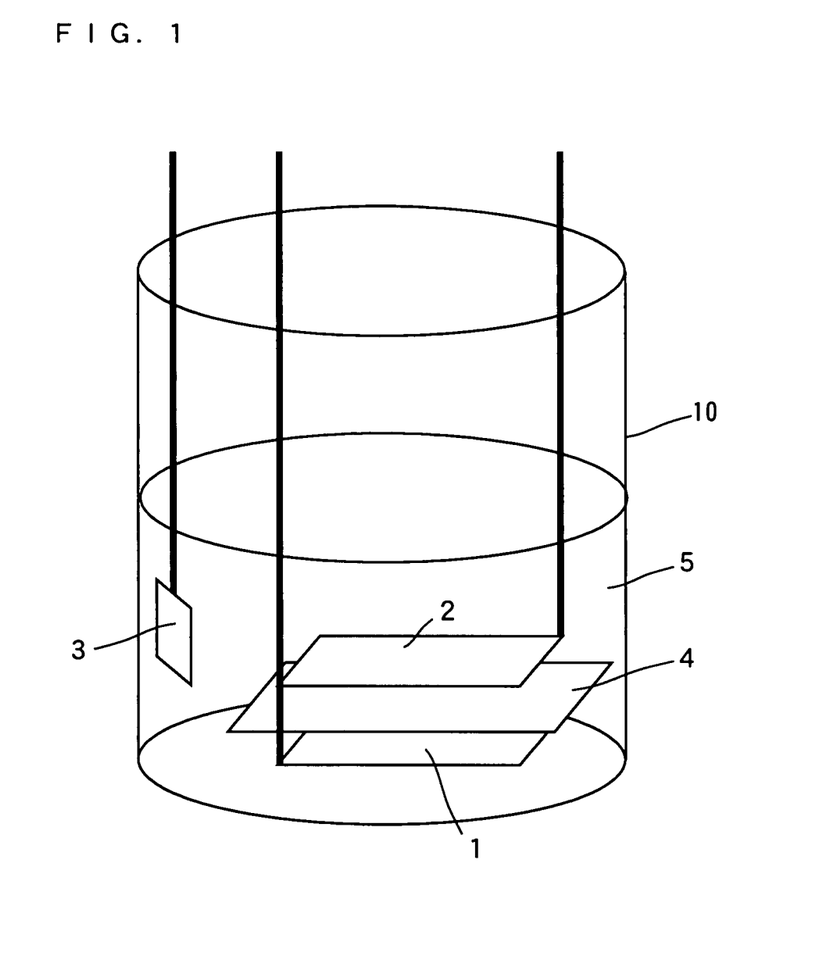
FIG. 1 is a schematic view of a test cell of a non-aqueous electrolyte secondary battery according to a first embodiment.

FIG. 1 is a schematic view for use in illustrating a test cell of a non-aqueous electrolyte secondary battery according to the embodiment.

As shown in FIG. 1, in an inert atmosphere, a lead is attached to a positive electrode 1 and a lead is attached to a negative electrode 2 for example of a sodium metal. Note that in place of the negative electrode 2 of the sodium metal, the negative electrode 2 of another material such as a carbon material capable of storing and releasing sodium ions may be used.

Then, a separator 4 is inserted between the positive electrode 1 and the negative electrode 2, and the positive electrode 1, the negative electrode 2, and a reference electrode 3 for example of a sodium metal are provided in a cell container 10. The non-aqueous electrolyte 5 is injected into the cell container 10 to produce the test cell.

<Effects of First Embodiment>

The use of the positive electrode according to the embodiment allows sodium ions to be sufficiently stored and released. The use of sodium as an abundant resource can reduce the cost.

According to the embodiment, the use of the positive electrode described above for a non-aqueous electrolyte secondary battery allows reversible charge and discharge to be carried out and an inexpensive non-aqueous electrolyte secondary battery to be provided.

(2) Second Embodiment

Manufacture of Positive Electrode

The same positive electrode as that of the first embodiment is produced.

<Manufacture of Negative Electrode>

A rolled foil of surface roughened copper as thick as 26 μm for example having a surface formed into an irregular shape with copper precipitated thereon by an electrolytic method is prepared as a negative electrode collector.

Elemental tin (Sn) having a thickness of 2 μm for example is deposited on the rolled foil described above, so that a negative electrode active material layer is formed. Note that the deposited elemental tin is amorphous.

Then, the rolled foil having the negative electrode active material layer formed thereon is cut into a 2-by-2 cm piece and a negative electrode tab is attached to the rolled foil, so that the negative electrode is produced.

The arithmetic mean roughness Ra as a parameter representing a surface roughness defined by Japanese Industrial Standards (JIS B 0601-1994) in the surface-roughened rolled foil described above is preferably not less than 0.1 μm nor more than 10 μm. The arithmetic mean roughness Ra can be measured using for example a stylus type surface roughness meter.

When the amorphous negative electrode active material layer is deposited on the negative electrode collector of the rolled foil having its surface formed into the irregular shape, the surface of the negative electrode active material layer has a shape conforming to the irregular shape on the negative electrode collector.

When charge and discharge process is carried out using the negative electrode active material layer, stress associated with expansion and contraction of the negative electrode active material layer concentrates at the irregular part of the negative electrode active material layer, so that cracks are formed in the irregular part of the negative electrode active material layer. The cracks allow the stress generated by the charge and discharge to be dispersed. In this way, reversible charge and discharge can be carried out more easily, and a good charge/discharge characteristic can be obtained.

<Manufacture of Non-Aqueous Electrolyte>

The Same Non-aqueous electrolyte as that of the first embodiment is produced.

<Manufacture of Non-aqueous Electrolyte Secondary Battery>

Using the positive electrode, the negative electrode, and the non-aqueous electrolyte described above, a non-aqueous electrolyte secondary battery is produced as in the following paragraphs.

Figure 2:
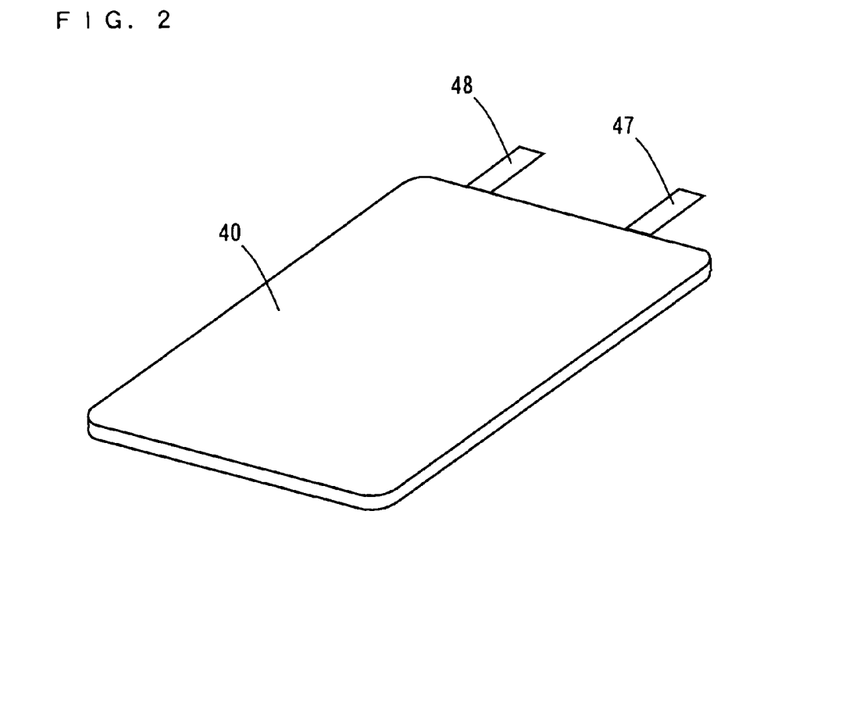
FIG. 2 is a perspective view of a non-aqueous electrolyte secondary battery according to a second embodiment.

FIG. 2 is a perspective view of the non-aqueous electrolyte secondary battery according to the embodiment.

As shown in FIG. 2, the non-aqueous electrolyte secondary battery according to the embodiment includes a case body 40 and a negative electrode tab 47 and a positive electrode tab 48 are extended externally from the inside of the case body 40.

Figure 3:
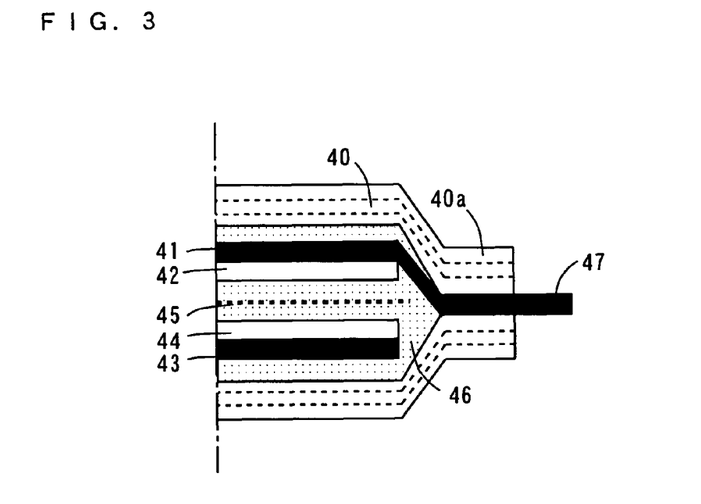
FIG. 3 is a schematic sectional view of the non-aqueous electrolyte secondary battery shown in FIG. 2.

FIG. 3 is a schematic sectional view of the non-aqueous electrolyte secondary battery shown in FIG. 2. The case body 40 is made of a laminated film for example of aluminum.

As shown in FIG. 3, a negative electrode collector 41 and a positive electrode collector 43 are provided in the case body 40.

A negative electrode active material layer 42 including tin is formed on the negative electrode collector 41, and a positive electrode active material layer 44 is formed on the positive electrode collector 43.

The negative electrode active material layer 42 formed on the negative electrode collector 41 and the positive electrode active material layer 44 formed on the positive electrode collector 43 are provided to be opposite to each other through a separator 45.

A non-aqueous electrolyte 46 is injected in the case body 40. At the end of the side of the case body 40 from which the negative electrode tab 47 and the positive electrode tab 48 are extended, a sealed opening 40a sealed by welding is formed.

The negative electrode tab 47 connected to the negative electrode collector 41 is externally extended through the sealed opening 40a. Although not shown in FIG. 3, the positive electrode tab 48 connected to the positive electrode collector 43 is also externally extended through the sealed opening 40a in the same manner as the negative electrode tab 47.

<Effects of Second Embodiment>

Sodium ions are sufficiently stored in and released from the positive electrode according to the embodiment. Sodium ions are sufficiently stored in and released from the negative electrode including elemental tin.

According to the embodiment, using the positive electrode and the negative electrode described above, a non-aqueous electrolyte secondary battery that allows reversible charge and discharge to be carried out and a good cycle characteristic to be obtained can be provided. Furthermore, the use of sodium which is available in abundance as a resource reduces the cost of the non-aqueous electrolyte secondary battery.

(3) Third Embodiment

A non-aqueous electrolyte secondary battery according to a third embodiment is different from the non-aqueous electrolyte secondary battery according to the second embodiment in the structure of the negative electrode, which will be described in detail.

<Manufacture of Negative Electrode>

A rolled foil of surface roughened copper as thick as 26 μm for example having a surface formed into an irregular shape with copper precipitated thereon by an electrolytic method is prepared as a negative electrode collector 41.

A negative electrode active material layer 42 of elemental germanium (Ge) as thick as 0.5 μm for example is deposited on the negative electrode collector 41 of the rolled foil as described above by a sputtering apparatus shown in FIG. 4. The deposition condition is given in Table 1. Note that the deposited elemental germanium is amorphous.

TABLE 1

| sputter source | RF frequency | 13.56 MHz |
|---|---|---|
| | RF power | 200 W |
| argon flow rate | | 50 sccm |
| gas pressure | | 1.7 to $1.8 \times 10^{-1}$ Pa |
| time | | 30 min |
| thickness | | 0.5 μm |

Figure 4:
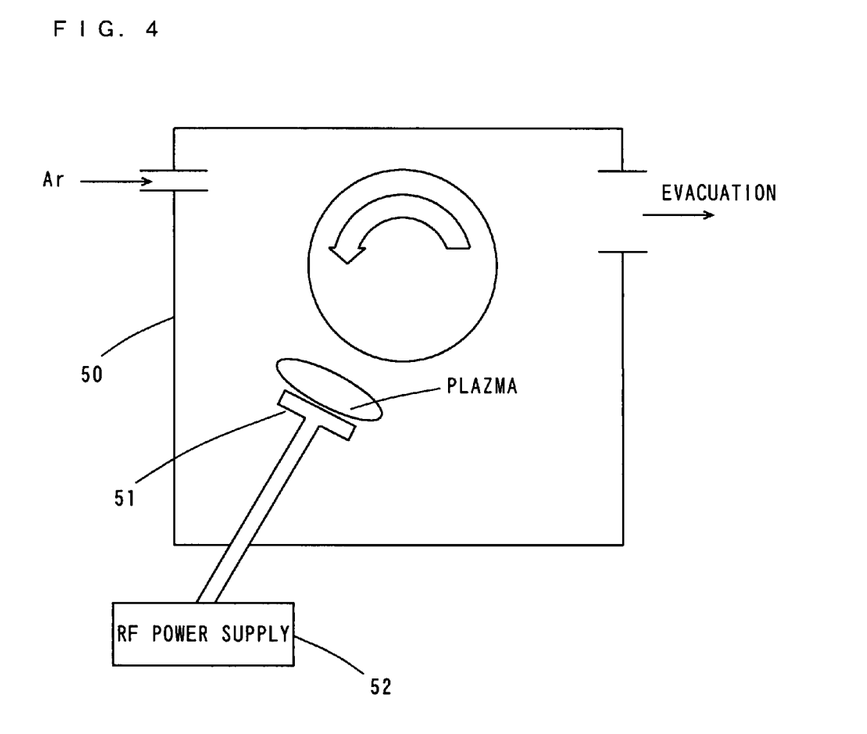
FIG. 4 is a schematic view of a sputtering apparatus.

To begin with, a chamber 50 is evacuated to $1 \times 10^{-4}$ Pa, then argon is introduced in the chamber 50 and the gas pressure in the chamber 50 is stabilized in the range from 1.7 to $1.8 \times 10^{-1}$ Pa.

Then, while the gas pressure in the chamber 50 is thus stabilized, a sputter source 51 of elemental germanium is provided with radio frequency power by a radio frequency power supply 52 for a prescribed period. In this way, the negative electrode active material layer 42 of the elemental germanium is deposited on the negative electrode collector 41.

Then, the negative electrode collector 41 having the negative electrode active material layer 42 of the elemental germanium deposited thereon is cut into a 2-by-2-cm piece and a negative electrode tab 47 is attached to the piece to produce a negative electrode.

The arithmetic mean roughness Ra as the surface roughness defined by Japanese Industrial Standards (JIS B 0601-1994) in the surface-roughened rolled foil described above is preferably not less than 0.1 μm nor more than 10 μm.

<Effects of Third Embodiment>

Sodium ions are sufficiently stored in and released from the positive electrode according to the embodiment. Sodium ions are sufficiently stored in and released from the negative electrode including the elemental germanium.

According to the embodiment, using the positive electrode and the negative electrode described above, a non-aqueous electrolyte secondary battery that allows reversible charge and discharge to be carried out and a good cycle characteristic to be obtained can be provided. In addition, the use of sodium that is available in abundance as a resource can reduce the cost of the non-aqueous electrolyte secondary battery.

INVENTIVE EXAMPLES

Inventive Example 1 and Evaluation Thereof

As in the following paragraphs, a test cell produced according to the first embodiment was used to examine the charge/discharge characteristic of the non-aqueous electrolyte secondary battery.

Figure 5:
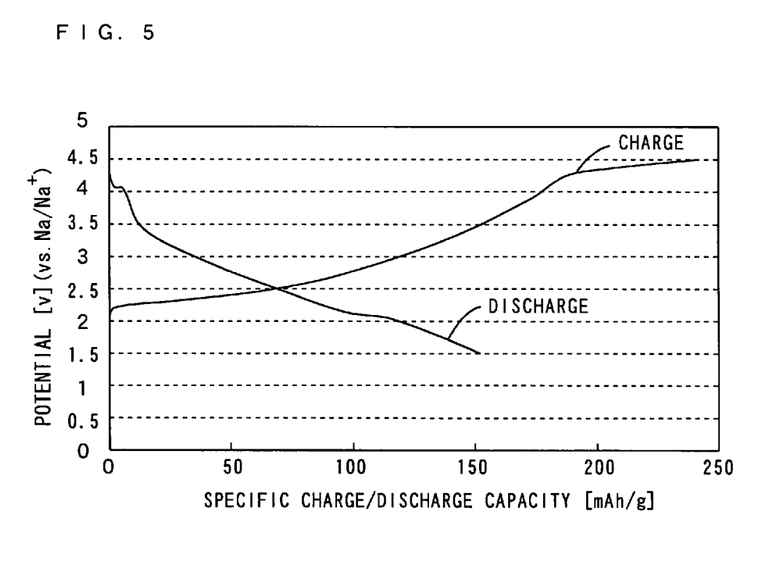
FIG. 5 is a graph showing the charge/discharge characteristic of a non-aqueous electrolyte secondary battery according to Inventive Example 1.

FIG. 5 is a graph showing the charge/discharge characteristic of a non-aqueous electrolyte secondary battery according to Inventive Example 1.

In the produced test cell, charge was carried out until the potential of the positive electrode 1 with respect to the reference electrode 3 reached 4.2 V with a constant current of 0.15 mA.

Then, with a constant current of 0.15 mA, discharge was carried out until the potential of the positive electrode 1 with respect to the reference electrode 3 reached 1.5 V and the charge/discharge characteristic was examined.

It was found as a result that the specific discharge capacity per gram of the positive electrode active material was about 151 mAh/g and good charge and discharge was performed.

More specifically, it was found that sodium ions were reversibly stored in and released from the positive electrode 1. In this way, the advantage of the new non-aqueous electrolyte secondary battery over the conventional non-aqueous electrolyte secondary battery using lithium ions was recognized.

Inventive Example 2 and Evaluation Thereof

As in the following paragraphs, the charge/discharge characteristic of a non-aqueous electrolyte secondary battery produced according to the second embodiment was examined.

Figure 6:
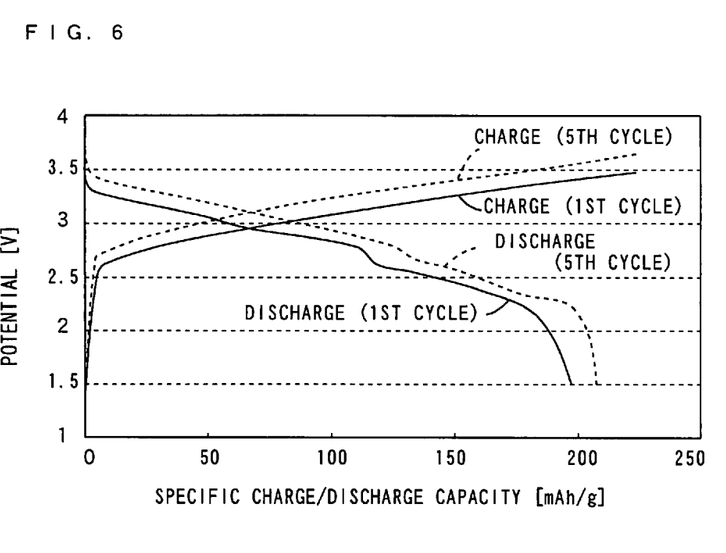
FIG. 6 is a graph showing the charge/discharge characteristic of a non-aqueous electrolyte secondary battery according to Inventive Example 2.

FIG. 6 is a graph showing the charge/discharge characteristic of a non-aqueous electrolyte secondary battery according to Inventive Example 2.

In the non-aqueous electrolyte secondary battery described above, charge was carried out until the specific charge capacity per gram of the negative electrode active material was about 225 mAh/g with a constant current of 1.2 mA, and discharge was carried out until the discharge cutoff voltage was 1.5 V with a constant current of 1.2 mA.

It was found as a result that in the first cycle of charge and discharge process, the specific discharge capacity per gram of the negative electrode active material was about 197 mAh/g and good charge and discharge was performed.

Similarly, in the fifth cycle of charge and discharge process, the specific discharge capacity per gram of the negative electrode active material was about 207 mAh/g, and a good cycle characteristic was obtained.

More specifically, it was found that sodium ions were stored and released reversibly in and from the positive electrode. In this way, the advantage of the new non-aqueous electrolyte secondary battery over the conventional non-aqueous electrolyte secondary battery using lithium ions was recognized.

Inventive Example 3 and Evaluation Thereof

As in the following paragraphs, the charge/discharge characteristic of a non-aqueous electrolyte secondary battery produced according to the third embodiment was examined.

Figure 7:
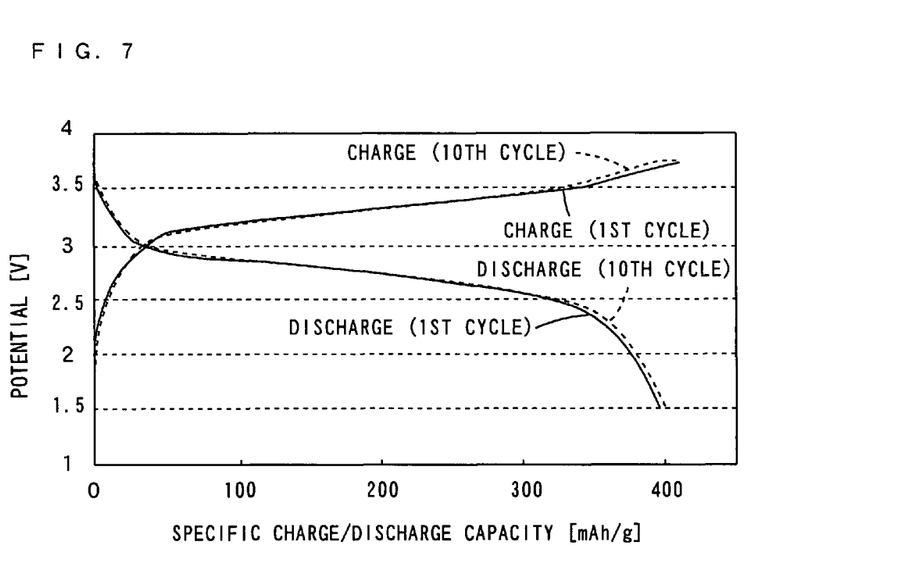
FIG. 7 is a graph showing the charge/discharge characteristic of a non-aqueous electrolyte secondary battery according to Inventive Example 3.

FIG. 7 is a graph showing the charge/discharge characteristic of a non-aqueous electrolyte secondary battery according to Inventive Example 3.

In the non-aqueous electrolyte secondary battery described above, charge was carried out until the specific charge capacity per gram of the negative electrode active material was about 412 mAh/g with a constant current of 0.2 mA, and then discharge was carried out until the discharge cutoff voltage reached 1.5 V with a constant current of 0.2 mA.

It was found as a result that in the first cycle of charge and discharge process, the specific discharge capacity per gram of the negative electrode active material was about 398 mAh/g and good charge and discharge was performed.

It was also found that in the tenth cycle of charge and discharge process, the specific discharge capacity per gram of the negative electrode active material was about 400 mAh/g and a good cycle characteristic was obtained.

More specifically, it was found that sodium ions were stored and released reversibly in and from the positive electrode and the negative electrode. In this way, the advantage of the new non-aqueous electrolyte secondary battery over the conventional non-aqueous electrolyte secondary battery using lithium ions was recognized.

INDUSTRIAL APPLICABILITY

The non-aqueous electrolyte secondary battery according to the invention may be applied as various kinds of power supplies such as a portable power supply and an automotive power supply.

The invention claimed is:

1. A non-aqueous electrolyte secondary battery, comprising:
   a positive electrode including $Na_xMnO_{2+y}$, said x being more than 0 and at most 1, and said y being more than −0.1 and less than 0.1, the crystal structure of said $Na_xMnO_{2+y}$ being a hexagonal system, a monoclinic system or a tetragonal system;
   a negative electrode; and
   a non-aqueous electrolyte containing sodium ions, wherein the positive electrode is configured to release and store the sodium ions in the non-aqueous electrolyte reversibly during charge and discharge respectively.

2. The non-aqueous electrolyte secondary battery according to claim 1, wherein said negative electrode includes a current collector.

3. The non-aqueous electrolyte secondary battery according to claim 2, wherein said collector has a roughened surface.

4. The non-aqueous electrolyte secondary battery according to claim 2, wherein the arithmetic mean roughness of the surface of said collector is not less than 0.1 μm nor more than 10 μm.

5. The non-aqueous electrolyte secondary battery according to claim 1, wherein said non-aqueous electrolyte includes one or more selected from the group consisting of a cyclic carbonate, a chain carbonate, esters, cyclic ethers, chain ethers, nitriles, and amides.

6. The non-aqueous electrolyte secondary battery according to claim 1, wherein said non-aqueous electrolyte includes sodium hexafluorophosphate.

7. The non-aqueous electrolyte secondary battery according to claim 1, wherein said x is at least 0.7 and at most 1, and said negative electrode includes a material that is capable of storing and releasing sodium ions.

8. The non-aqueous electrolyte secondary batter battery according to claim 7, wherein the material is a carbon material.

9. A non-aqueous electrolyte secondary battery, comprising:
   a positive electrode including $Na_xMnO_{2+y}$, said x being more than 0 and at most 1, and said y being more than −0.1 and less than 0.1, the crystal structure of said $Na_xMnO_{2+y}$ being a hexagonal system, a monoclinic system or a tetragonal system;
a negative electrode; and
a non-aqueous electrolyte containing sodium ions;
wherein the positive electrode does not include lithium.

* * * * *